(12) United States Patent
Walter et al.

(10) Patent No.: US 8,352,516 B2
(45) Date of Patent: Jan. 8, 2013

(54) MULTI-APPLICATION OBJECT MAPPING TOOL

(75) Inventors: Wolfgang E. Walter, Hambruecken (DE); Amar Kumar, Neulussheim (DE)

(73) Assignee: SAP Aktiengesellschaft, Walldorf (DE)

( * ) Notice: Subject to any disclaimer, the term of this patent is extended or adjusted under 35 U.S.C. 154(b) by 543 days.

(21) Appl. No.: 11/390,614

(22) Filed: Mar. 27, 2006

(65) Prior Publication Data

US 2007/0226233 A1  Sep. 27, 2007

(51) Int. Cl.
*G06F 17/30* (2006.01)
(52) U.S. Cl. ........ 707/809; 707/602; 707/607; 707/763; 707/796; 707/803; 709/201; 717/100; 719/319; 719/320
(58) Field of Classification Search ................ 707/104.1, 707/100, 763, 796, 803, 809, 810, 999.1, 707/602, 607; 709/201; 717/100; 719/319, 719/320
See application file for complete search history.

(56) References Cited

U.S. PATENT DOCUMENTS

| | | | |
|---|---|---|---|
| 6,662,237 B1 * | 12/2003 | Leckie | 719/320 |
| 6,823,495 B1 * | 11/2004 | Vedula et al. | 715/805 |
| 7,243,306 B1 * | 7/2007 | Joshi et al. | 715/735 |
| 7,403,956 B2 * | 7/2008 | Vaschillo et al. | 707/770 |
| 7,461,091 B2 * | 12/2008 | Schneider et al. | 707/104.1 |
| 7,809,757 B2 * | 10/2010 | Zhuang et al. | 707/795 |
| 2002/0091702 A1 * | 7/2002 | Mullins | 707/100 |
| 2005/0120342 A1 * | 6/2005 | Saracco et al. | 717/162 |
| 2005/0262188 A1 * | 11/2005 | Mamou et al. | 709/203 |
| 2006/0184568 A1 * | 8/2006 | Barcia | 707/103 R |

OTHER PUBLICATIONS

Lee Gavin, Gangadhara Rao Akana, Axel Angeli, Sreedhar Reddy Bhunirddy, Peter Gersak, Nizam Ishmael, Hari Kamar Nagumalla, Viral Ved: IBM Redbooks "A B2B Solution using WebSphere Business Integration V4.1 and WebSphere Business Connection V1.1"; Aug. 2003; pp. Cover,51-56,67-88,153-164,296,288.*

* cited by examiner

*Primary Examiner* — Dennis Truong
(74) *Attorney, Agent, or Firm* — Blakely, Sokoloff, Taylor & Zafman LLP

(57) ABSTRACT

Methods and apparatuses enable a generic mapping tool accessible to multiple applications. One or more of the applications may invoke the mapping tool to map objects to each other with a defined relationship. The mapping occurs dynamically during the run-time of the application. The flexibility of the mapping tool enables the use of standard mapping mechanisms.

17 Claims, 4 Drawing Sheets

410

| MAP ID | MAP TYPE | STATUS | OBJ 1 TYPE | OBJ 1 ID 1 | OBJ 1 ID 2 | OBJ 2 TYPE | OBJ 2 ID 1 | OBJ 2 ID 2 | APPLICATION APPENDS |
|---|---|---|---|---|---|---|---|---|---|
| 0011 | ID2ODO | OPEN | ID | 1800010 | 0010 | ODO | 8000032 | 0010 | ... |
| 0012 | ID2ODO | COMPLETED | ID | 1800010 | 0020 | ODO | 8000033 | 0010 | ... |

412 → 0011
414 → 0012

420

| MAP ID | MAP TYPE | STATUS | OBJ 1 TYPE | OBJ 1 ID 1 | OBJ 1 ID 2 | OBJ 2 TYPE | OBJ 2 ID 1 | OBJ 2 ID 2 | APPLICATION APPENDS |
|---|---|---|---|---|---|---|---|---|---|
| 0021 | ST2SO | OPEN | ST | BATCH1 | | SO | 110 | 0010 | ... |
| 0022 | ST2OD | COMPLETED | ST | BATCH2 | | OD | 8000034 | 0010 | ... |

MULTI-APPLICATION OBJECT MAPPING TOOL

FIELD

Embodiments of the invention relate to object mapping, and more particularly to a mapping tool accessible to multiple applications.

BACKGROUND

In business applications, there it is often useful to map one business object to another. The business objects may be documents that are semantically or contextually related within the context of the business application. For example, a sales order may be mapped to a delivery, a delivery to a stock, a stock to a purchase order or production order, etc. Some business applications or business systems support cross-docking, where inbound deliveries are coordinated with outbound deliveries to eliminate goods processing operations and improve efficiency. The mapping of outbound deliveries to inbound deliveries, inbound transfers, and/or inbound stock can be significantly important to enable the cross-docking scenarios.

In current applications, each business object may have an independent concept of mapping. Thus, the functions or actions performed to map one business object to another may not be the same functions or actions needed to map other business objects. Examples of mapping concepts include, but are not limited to, use of document history, use of reservation table(s), via cross-docking decision table(s), etc. When a new business application is developed, it may be developed with its own independent method of mapping. The use of independent methods of mapping results in wasted and/or duplicated effort.

SUMMARY

A mapping tool can be made accessible to multiple applications. With an interface common to the multiple applications, the mapping tool can be used by one or more of the applications to generate a mapping of objects to each other. The application can identify objects to be mapped, and a relationship for the objects. The mapping tool dynamically maps the objects as requested, and stores the mapping.

BRIEF DESCRIPTION OF THE DRAWINGS

The following description includes discussion of various figures having illustrations given by way of example of implementations of embodiments of the invention. The drawings should be understood by way of example, and not by way of limitation.

FIG. 4 is a block diagram of embodiments of mapping tables.

DETAILED DESCRIPTION

Figure 1:
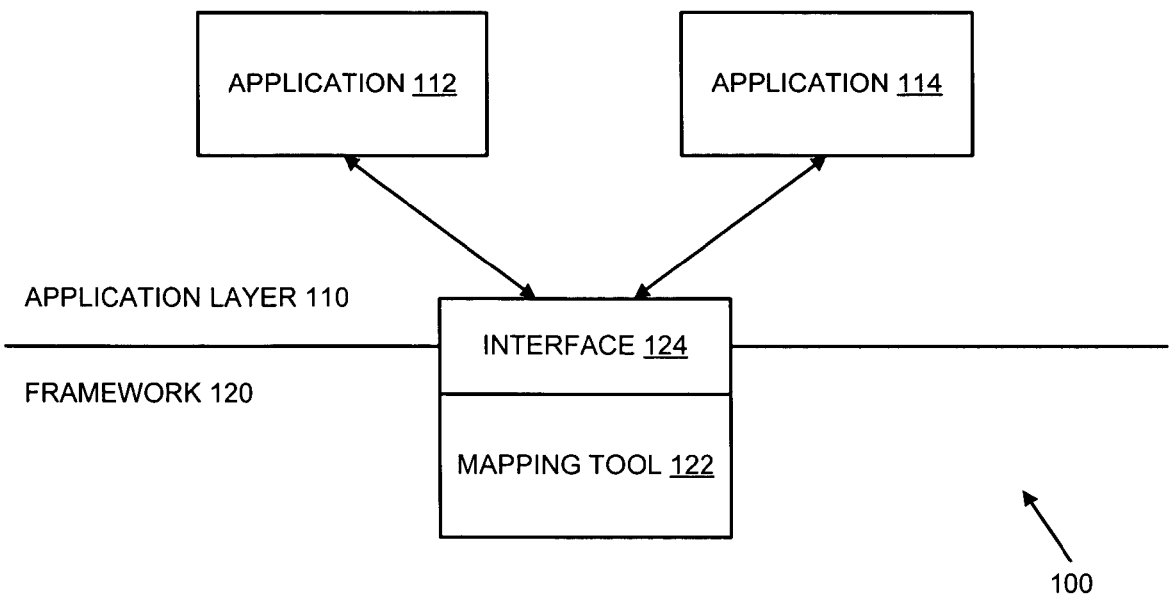
FIG. 1 is a block diagram of an embodiment of multiple applications having access to a mapping tool.

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

A mapping tool can be made generic, with an interface to which multiple applications can have access. Thus, one or more applications can use the mapping tool to map objects. As used herein, an application refers to a program or compilation of functions/services to interact with objects. The term "business application" may be used herein, which specifically refers to an application that is used to perform a business function or process, or otherwise achieve a business result (e.g., a warehouse management application). An object refers to a basic element of an application or process, and includes data and business logic/rules with which to manipulate the data. Objects are accessible via service interfaces, which may be provided by the applications. Objects in many business instances are closely related to documents representing the data or a process phase with which the data is affected. In many business scenarios, objects are mapped, or given a relationship with respect to another object. Thus, reference to mapping of objects may refer to making a relationship between documents containing data related to a business process or activity.

With traditional approaches, mapping, or assigning relationships between objects could be performed in any number of ways. Thus, the same object or object type may be accessed and/or manipulated in different ways by different applications. Similarly, the same application may treat different objects differently. Generally traditional approaches fixed definitions for mappings prior to execution of an application. In contrast to the traditional approach, a mapping tool can be made generic to allow applicability of its functions to different applications. Additionally, a common interface is provided to allow multiple applications to invoke/use the mapping tool. The mapping tool can provide a standard methodology or mechanism to access and/or manipulate object mappings. Furthermore, the mapping occurs dynamically, and can be performed at some point in the execution of an application. During runtime of a system, a mapping can be changed or added, and various aspects of the mapping can be defined at runtime. A mapping can then be retrieved from the system when an object is requested. Thus, a mapping associated with a requested object is obtained when the object is requested.

FIG. 1 is a block diagram of an embodiment of multiple applications having access to a mapping tool. System 100 represents a system with application layer 110 and framework 120. Application layer 110 includes multiple applications, 112-114, to perform operations related to business results. Applications 112-114 may be any type of application that operates on objects, and may include modeled software.

Framework 120 provides backend tools for use by elements of application layer 110. In one embodiment, framework 120 includes mapping tool 122, which provides mapping of objects. Mapping tool 122 may receive inputs from applications 112-114 to identify the objects to be mapped, for example, via handles, memory addresses, etc. Interface 124 provides an interface to mapping tool 122. In one embodiment, interface 124 is a function call, or other invocation with arguments/parameters. Interface 122 may be available as part of a library available to applications 112-114. Thus, mapping tool 122 may be available to multiple applications. Any application with access to mapping tool 122 can invoke the mapping tool and utilize its functionality. Note that accessibility to mapping tool 122 from applications 112-114 does not necessarily imply use of the mapping tool by every application.

Figure 2:
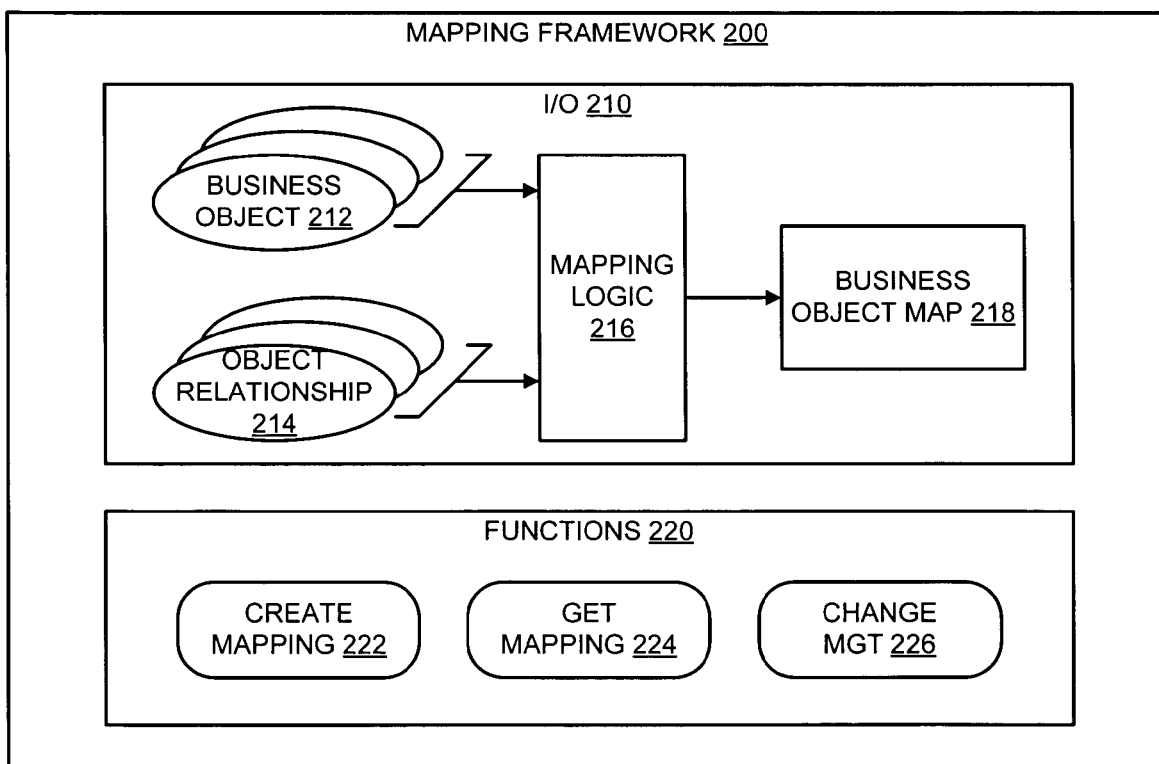
FIG. 2 is a block diagram of an embodiment of a mapping framework.

FIG. 2 is a block diagram of an embodiment of a mapping framework. Mapping framework 200 represents a framework of logic and functionality to perform object mapping. Mapping framework 200 may be a framework according to framework 120 of FIG. 1. Mapping framework 200 may provide a tool for use by an application, or elements from which elements of an application may be derived.

Mapping framework 200 includes Input/Output (I/O) 210. I/O 210 may be one example of interface 124 of FIG. 1. Within I/O 210, one or more business objects 212 and object relationship 214 can be received as input. Business objects 212 are examples of objects as described herein, and may be embodied in documents or in another form. As inputs, business objects 212 may be received directly (e.g., the requestor passing a document) or indirectly (e.g., the requestor passing a memory address, a handle, etc.). Business objects 212 are thus identified to a mapping tool as being the subject of a mapping request. One or more business objects may be requested to be mapped to one or more other business objects. In addition to indicating the business objects in a request for action on a mapping (e.g., creating a mapping, modifying an existing mapping), object relationships 214 may also be defined. Object relationships 214 can indicate a manner in which objects should be managed, at least by virtue of a mapping with another object. Object relationships 214 may be new relationships, or information on how to modify existing relationships. In one embodiment (e.g., deletion of a mapping), an object relationship may not be defined.

Mapping logic 216 of I/O 210 represents logic or processing or functionality with which to execute a request. Thus, in response to a request received from an application at mapping framework 200, one or more mapping operations may be performed. Examples of functionality that may be implemented are represented in functions 220, described below. Mapping logic 216 receives as input the objects identified by the requesting application, and a new or modified relationship description. As an output, mapping logic 216 generates business object map 218, which reflects the relationship indicated for the identified objects.

Mapping framework 200 includes functions 220, which can include a variety of different functions including, but not limited to, create mapping 222, get mapping 224, and change management 226. Create mapping 222 refers to the ability of mapping logic 216 to generate a new mapping. Create mapping 222 may include capability to a file, a table, or other data store in which business object map 218 will be stored. The data store can exist in non-volatile and/or volatile memory. Create mapping 222 provides a mapping for a relationship that is not already stored in the system.

Get mapping 224 provides the ability to search and find one or more mappings. Get mapping 224 may include logic to interpret a data store, for example, a mapping table. To interpret a data store, get mapping 224 could include an understanding of a formatting of one or more data stores. In one embodiment, the generic nature of a mapping tool provides for a single data store format for all mappings. Get mapping 224 may be invoked when a request for a data object having a mapping is received. Get mapping 224 can thus obtain or retrieve the mapping for the requested object. Change management 226 provides functionality to change an existing mapping, including modifying the fields of a data store of a mapping. The changes to the mapping can affect how the objects are managed.

Figure 3:
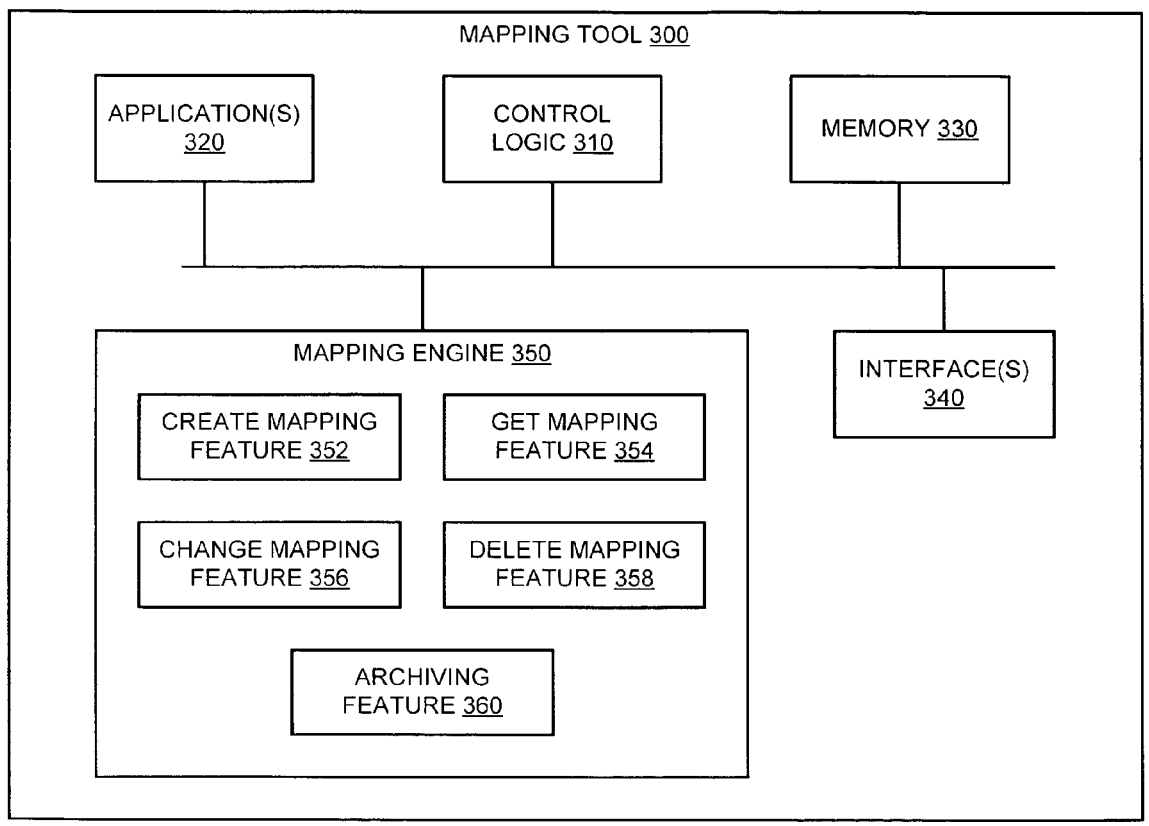
FIG. 3 is a block diagram of an embodiment of a mapping tool.

FIG. 3 is a block diagram of an embodiment of a mapping tool. Mapping tool 300 includes control logic 310, which implements logical functional control to direct operation of mapping tool 300, and/or hardware associated with directing operation of mapping tool 300. Logic may be hardware logic circuits and/or software routines. In one embodiment, mapping tool 300 includes one or more applications 320, which represent code sequence and/or programs that provide instructions to control logic 310. Mapping tool 300 includes memory 330 and/or access to memory resource 330 for storing data and/or instructions. Memory 330 may include memory local to mapping tool 300, as well as, or alternatively, including memory of the host system on which mapping tool 300 resides. Mapping tool 300 also includes one or more interfaces 340, which represent access interfaces to/from (an input/output interface) mapping tool 300 with regard to entities (electronic or human) external to mapping tool 300. Interfaces 340 include mechanisms through which mapping tool 300 can be incorporated into a host application, and may further include interfaces from mapping tool 300 to other components or applications of a system in which the host application executes.

Mapping tool 300 receives requests from other components (e.g., an application) via interfaces 340. Interfaces 340 may include a function or interface call, and alternatively, or in addition, may include physical input lines/pins. Interfaces 340 also include an output mechanism (e.g., a return for a call, an output line or an output driver for a line that receives input) to provide a result to a requesting application. In one embodiment, interfaces 340 include an interface to a system server or database (e.g., an Enterprise Resource Planning (ERP) database, a Customer Resource Management (CRM) backend) that enables mapping tool 300 to access data objects, rules, mapping tables, etc., for read and/or write.

Mapping tool 300 also includes mapping engine 350, which represents one or more functions that enable mapping tool 300 to provide mapping of objects. The functions include, or are provided by, one or more of create mapping feature 352, get mapping feature 354, change mapping feature 356, delete mapping feature 358, and archiving feature 360. Other features may be included, making other versions of mapping engine 350 that are more or less complex than what is shown. As used herein, a feature may refer to a function, a module, a routine, a subsystem, etc., whether hardware, software, or some combination. Thus, "feature" should be interpreted in an illustrative, and not a restrictive sense. Each feature could be a module within mapping tool 300.

In one embodiment, mapping engine 350 provides an illustrative view of functions 220 of FIG. 2. Thus, create mapping feature 352, get mapping feature 354, and change mapping feature 356 can be seen as comparable to the elements of functions 220 of FIG. 2, described above. Briefly summarizing, create mapping feature 352 provides the ability to generate a new mapping for one or more business objects to one or more other business objects, which may include generating a mapping table or other data store in which to record the mapping. In addition to what is described previously, create mapping feature 352 may enable mapping tool 300 to provide an application-specific element to a mapping. Such an application-specific element may be referred to as an application append. For example, the mapping table or data store can have a field or section where specific information or instructions are stored that may be interpreted by a particular application, and may be meaningless to another application. Multiple application appends could be stored in a single mapping, and identified, for example, by an application-specific identifier. Such an application-specific information mechanism can enable mapping tool 300 to provide a single mapping format, and still enable additional information to be provided in the mapping that may not be applicable to other applications invoking the mapping tool.

Get mapping feature 354 provides the ability to obtain mappings for a given object or relationship. Get mapping feature 354 can include the ability to obtain and pass an application append in response to a request by an application. Change mapping feature 356 provides the ability to edit or modify an existing or identifiable mapping. Change mapping feature 356 may also include the ability to modify an application append.

Delete mapping feature 358 provides the ability to remove a mapping at the request of an application. Delete mapping feature 358 may also include the ability to eliminate only one or more application appends, and leave the remainder of a mapping otherwise intact. Thus, there may be more precise management of a mapping that may be used by multiple applications. Archiving feature 360 provides the ability of mapping tool 300 to store copies and make backups of a mapping. In an embodiment where archiving feature 360 is available, there may be rules placed on delete mapping feature 358 to specify whether or not to delete archives in addition to the original, or which archives to delete, etc.

Mapping tool 300 may include hardware, software, and/or a combination of these. In a case where mapping tool 300 or its constituent components includes software, the software data, instructions, and/or configuration may be provided via an article of manufacture by a machine/electronic device/hardware. An article of manufacture may include a machine accessible/readable medium having content to provide instructions, data, etc. The content may result in an electronic device performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.). The machine accessible medium may further include an electronic device having code loaded on a storage that may be executed when the electronic device is in operation. Thus, delivering an electronic device with such code may be understood as providing the article of manufacture with such content described herein. Furthermore, storing code on a database or other memory location and offering the code for download over a communication medium may be understood as providing the article of manufacture with such content described herein.

FIG. 4 is a block diagram of embodiments of mapping tables. Mapping tables 410 and 420 illustrate examples of potential mapping tables or mapping data stores, as introduced above. Mapping table 410 includes rows 412 and 414, which represent different mappings stored in mapping table 410. In one embodiment, each application that invokes the mapping tool generates and stores a mapping table local to the application. Thus, each application could have its own mapping table, which may be referred to as dynamic mapping tables. In another embodiment, the mapping tool generates a mapping table that stores mappings for all applications that invoke the mapping tool. Thus, all applications could store mappings in the same mapping table, which may be referred to as a static mapping table.

Row 412 shows an example of a mapping with an identifier '0011', and of a type 'ID2ODO', or Inbound Delivery (ID) to Outbound Delivery Order (ODO). Thus, row 412 refers to a mapping of an inbound delivery object to an outbound delivery order object. Status can show the state of a transaction implicated by the mapping. Row 412 includes an indicator of the object type of the first object (ID), as well as one or more identifiers for the object (ID 1 and ID 2). More or fewer identifiers could be used. The second object (ODO) is identified by type and one or more identifiers. In one embodiment, a different number of identifiers could be used for different objects. Additionally, although only two objects are shown mapped, there is no restriction to mapping two objects. In one embodiment, a single mapping event could produce multiple rows showing multiple mappings of two objects to each other, even though the single mapping event mapped multiple objects to another object. A "mapping event" refers to one or more actions or operations performed by a mapping tool in response to receiving a mapping request from an application. In one embodiment, if a request identifies more than two objects to be mapped, the mapping could be stored as multiple rows of one-object to one-object mappings. In another embodiment, the one-to-many mapping may be stored in a single mapping table row that identified all objects mapped. Thus, the mapping tables shown are merely illustrative, and multiple variations are possible.

Row 414 includes a similar mapping as row 412. Note that the mapping type of rows 412 and 414 are the same (namely, type 'ID2ODO', or inbound delivery to outbound delivery order). In one embodiment, mapping table 410 is an "ID2ODO mapping table," meaning a table that stores only ID2ODO mappings. Thus, in addition to the alternatives of having each application store its own mapping tables versus having the mapping table store all mappings, mapping tables could be generated at either the applications or at the mapping tool that store mappings of only a single type, or alternatively, that store mappings of multiple types or all types.

Note that mapping table 410 and 420 include a field for application appends in each row. As mentioned above, application appends can store information specific to a particular application, specific to a particular implementation or process, etc.

Mapping table 420 illustrates a mapping table having mappings of different types than the type of rows 412-414, in that row 422 is of type 'ST2SO' mapping, and row 424 is of type 'ST2OD'. Mapping table 420 includes row 422 with mapping '0021' of type 'ST2SO', or stock (ST) to sales order (SO), where the stock may be identified by mere reference to the batch number or batch identifier. Row 424 includes mapping '0022' of type 'ST2OD', or stock (ST) to outbound delivery (OD).

Figure 5:
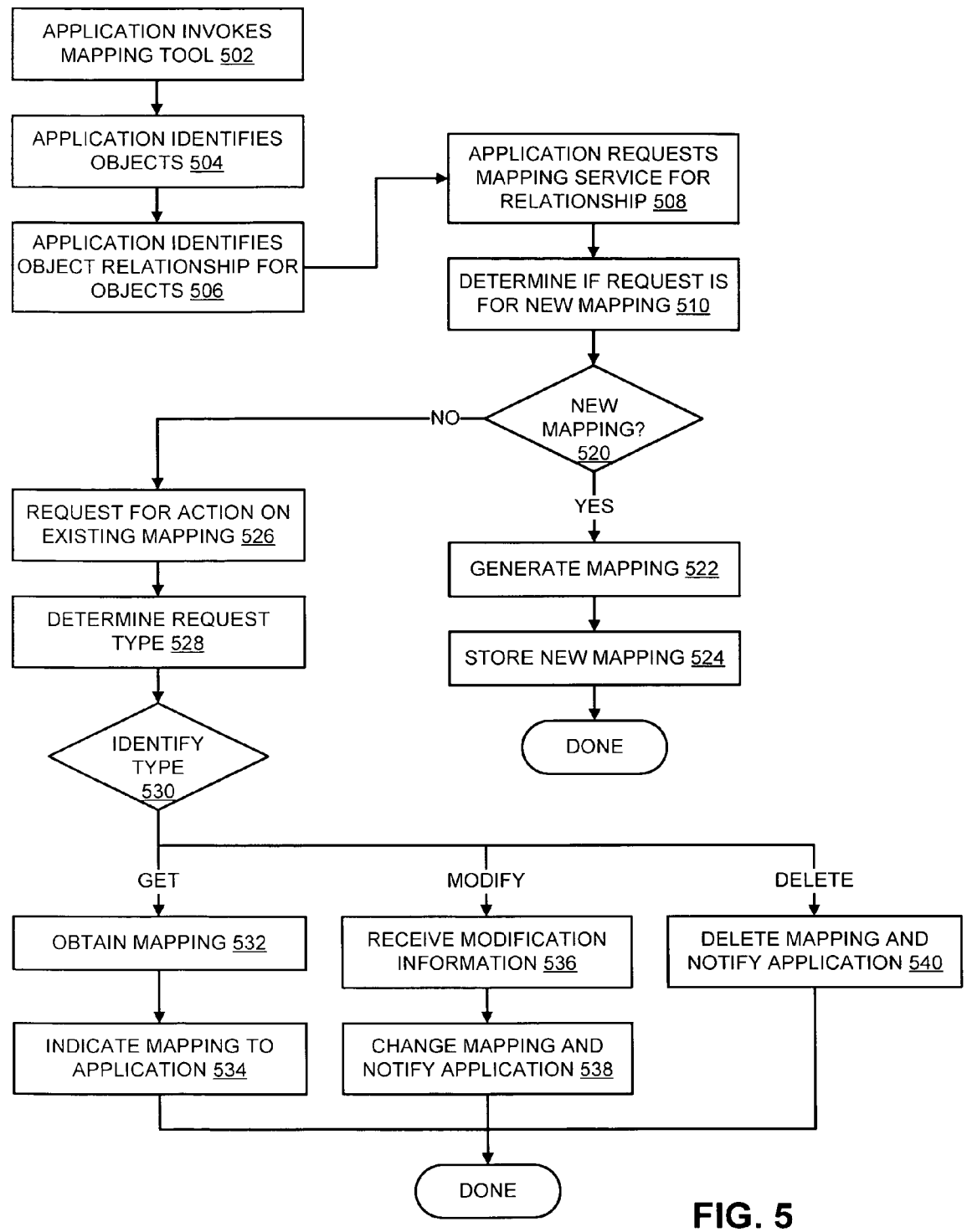
FIG. 5 is a flow diagram of an embodiment of mapping objects.

FIG. 5 is a flow diagram of an embodiment of mapping objects. A requesting application invokes a mapping tool, 502. In one embodiment, the application includes derived components that are inherited into the application. The invocation of the mapping tool can be through functionality inherited into the application. As part of a request for mapping services to the mapping tool, the application identifies the objects that are the subject of the request, 504. Identification of the objects can be through an object identifier, a system number for a particular object, or through passing the object to the mapping tool.

The application also identifies an object relationship for the objects, 506. In one embodiment, the application may have access to standard relationship types (e.g., mapping types could be relationship types), which the application identifies. In another embodiment, the application could generate a new mapping type. In the case of a generating a new mapping type, the application may also provide rules to the system regarding how the relationship is to be managed, or what the relationship means. The application requests mapping services for the relationship, 508. The request may be for a mapping of objects to each other, or for modification of an existing mapping.

The mapping tool receiving the request determines if the request is for generation of a new mapping, 510. A new mapping as used herein generally refers to a new instance of a mapping, and not necessarily that the mapping is of a type of mapping not previously known or used. Thus, a new mapping generally refers to an instance of a mapping type to identified objects, but could also refer to generating a new type of mapping. If the mapping is a new mapping, 520, the mapping tool generates the mapping, 522, for example, by generating a mapping table or adding one or more entries in a mapping table. The mapping tool stores the new mapping, 524, which may be part of generating the new mapping.

If the mapping request is not for a new mapping, the request is for action on an existing mapping, 526. The mapping tool determines the request type, 528, and identifies the request, 530. If the mapping request is for a "get mapping" action, the mapping tool obtains the mapping identified, 532, and indicates the mapping to the requesting application, 534. If the mapping request if for a "modify mapping" action, the mapping tool receives the modification information, 536, which would generally be included in the mapping request. Alternatively, the mapping action request could be followed by an information request and response between the mapping tool and requesting application. With the identified modification information, the mapping tool changes the indicated mapping and notifies the application, 538. Modification of the mapping request may include changing one or more items of information in a mapping table or data store, which may include an application append. If the mapping request is for a "delete mapping" action, the mapping tool deletes the one or more items of information indicated and notifies the requesting application, 540.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for mapping objects, comprising:
   receiving at a mapping tool from a requesting application of multiple applications during runtime of the requesting application, a request identifying first and second objects both to be accessed and used within the requesting application,
      wherein the objects have defined identifiers that identify the objects and their object types, the two objects being of different types, and
      wherein the mapping tool is accessible to the multiple applications having different object mapping methods that indicate how to manage the objects together, the mapping tool accessible via an application interface common to the multiple applications such that each of the multiple applications can invoke the mapping tool,
      the mapping tool having logic generic to the multiple applications to map objects for the multiple applications with the same mapping logic;
   receiving from the requesting application a relationship definition for first and second objects, the relationship definition defining how the first and second objects interact with each other within the requesting application, the relationship related to a business process executed with the requesting application;
   dynamically generating a mapping between the first object and the second object to represent the relationship definition for the objects during runtime of the requesting application; and
   storing the object identifiers and the mapping in a mapping table to assign the relationship to the first and second objects within the requesting application.

2. The method of claim 1, wherein receiving the request identifying the objects comprises:
   receiving multiple identifier fields used by the application to reference the objects.

3. The method of claim 1, wherein receiving the request identifying the objects comprises:
   receiving an object type for the objects to indicate rules for mapping the object.

4. The method of claim 1, wherein receiving the request identifying the objects via the common application interface comprises:
   receiving the request identifying the objects via a base-level class from which the requesting application derives properties.

5. The method of claim 1, wherein generating the mapping between the first object and the second object comprises:
   generating a mapping between one of multiple objects and the second object in a one to many or many to one mapping.

6. The method of claim 1, further comprising:
   receiving an identifier for the requesting application; and
   storing the application identifier with the mapping and object identifiers in the mapping table.

7. The method of claim 1, wherein storing the object identifiers in the mapping table comprises:
   storing the object identifiers received from the requesting application in a static mapping table that stores mappings for multiple applications.

8. The method of claim 1, wherein storing the object identifiers in the mapping table comprises:
   generating a mapping table specific to the requesting application; and
   storing the object identifiers received from the requesting application in the specific mapping table.

9. The method of claim 1, further comprising:
   receiving a request for an identified object;
   retrieving the mapping from the mapping table for identified object in response to receiving the request.

10. An article of manufacture comprising a machine-accessible storage medium having content stored thereon to provide instructions to result in a machine performing operations, including:
   receiving from one of multiple applications sharing a mapping interface during runtime of the one application,
      an indication of multiple business objects all to be accessed and used within the one application by a business process of the application, wherein the business objects have identifiers that identify the business objects and their object types, the two objects being of different types, and a request for a mapping action related to a mapping of the business objects to each other, the mapping action resulting in a mapping representing a relationship definition defining how the business objects interact with each other within the one application that provided the indication and the request, the multiple applications having multiple different object mapping methods that indicate how to manage the business objects;

dynamically performing the mapping action in response to receiving the request for the mapping action to generate an object mapping for the indicated business objects that indicates the relationship defining how the business objects interact with each other during runtime of the one application, the relationship related to the business process executed with the one application, the dynamic mapping performed with logic generic to the multiple applications to map objects for the multiple applications with the same mapping logic, such that each of the multiple applications can invoke the mapping logic; and storing the object mapping in a mapping table to assign the relationship to the business objects within the one application.

11. The article of manufacture of claim 10, wherein the content for receiving the request for the mapping action comprises:

content for generating a new mapping, modifying an existing mapping, or deleting an existing mapping.

12. The article of manufacture of claim 10, wherein the content for receiving the indication of the multiple business objects comprises:

content for receiving an indication of multiple business objects to be mapped in a many-to-one relationship; and wherein the content for storing the object mapping in the mapping table comprises:

content for generating many one-to-one entries in the mapping table.

13. The article of manufacture of claim 10, wherein the content for storing the object mapping in the mapping table further comprises:

content for storing application-specific information in the mapping table.

14. A system for mapping objects, comprising:

a persistent storage having an enterprise resource planning (ERP) database to store enterprise data, including objects to be mapped to other objects; and a memory storing instructions to execute a mapping tool having an input/output (I/O) interface, coupled to the ERP database, the mapping tool to receive a request for an object mapping action from one of multiple applications having access to the mapping tool during runtime of the one application, the applications having different object mapping methods that indicate how to manage the objects together, the request to identify first and second objects associated with the mapping and an indication of a relationship to map to the first and second objects, the first and second objects both to be accessed and used within the one application, the objects having identifiers that identify the objects and their types, the two objects being of different types, the I/O interface accessible to multiple applications with generic mapping functions to enable the applications to assign mapping relationships to objects according to a common methodology, the mapping tool having logic generic to the multiple applications to map objects for the multiple applications with the same mapping logic, such that each of the multiple applications can invoke the mapping tool, and a mapping engine to perform the object mapping action in response to the request to produce an object mapping that indicates the relationship defining how the first and second objects interact with each other within the one application during runtime of the one application, the relationship related to a business process executed with the requesting relationship, and store the object mapping in the ERP database to assign the relationship to the first and second objects within the one application.

15. The system of claim 14, the mapping engine of the mapping tool to perform the object mapping action comprising the mapping engine to perform generating a new mapping, modifying an existing mapping, or deleting an existing mapping.

16. The system of claim 14, the mapping tool to receive the request from the application comprising the mapping tool to receive the request from a warehouse management application.

17. The system of claim 14, the I/O interface of the mapping tool to receive the request identifying the objects comprising the I/O interface to receive an address reference of the objects.

* * * * *